April 29, 1924.

H. E. NICHOLAS 1,492,178

APPARATUS FOR USE IN CANNING AND OTHER INDUSTRIES

Filed May 31, 1922    3 Sheets-Sheet 1

INVENTOR
Harry E. Nicholas
BY
Henry T. Williams
ATTORNEY

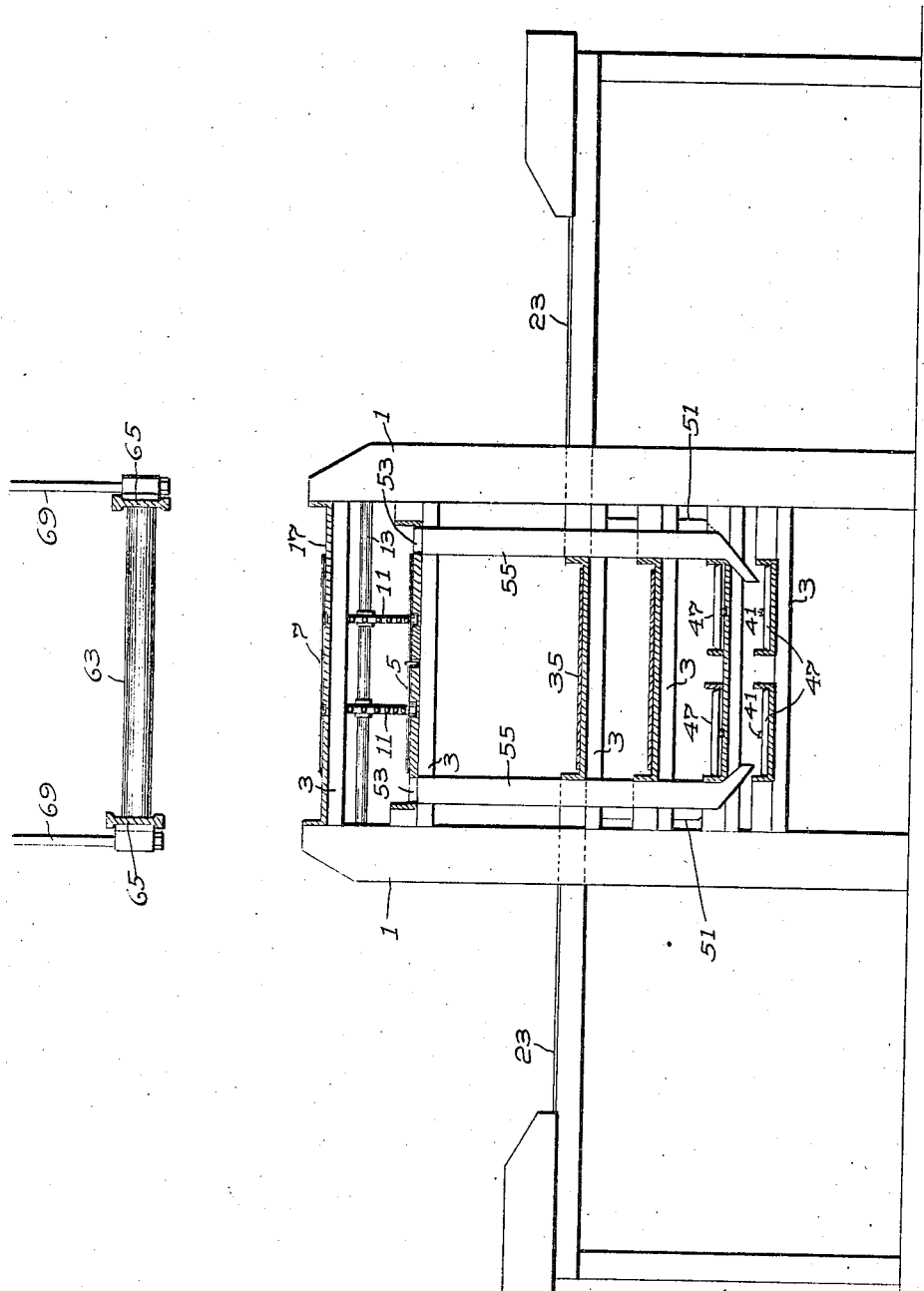

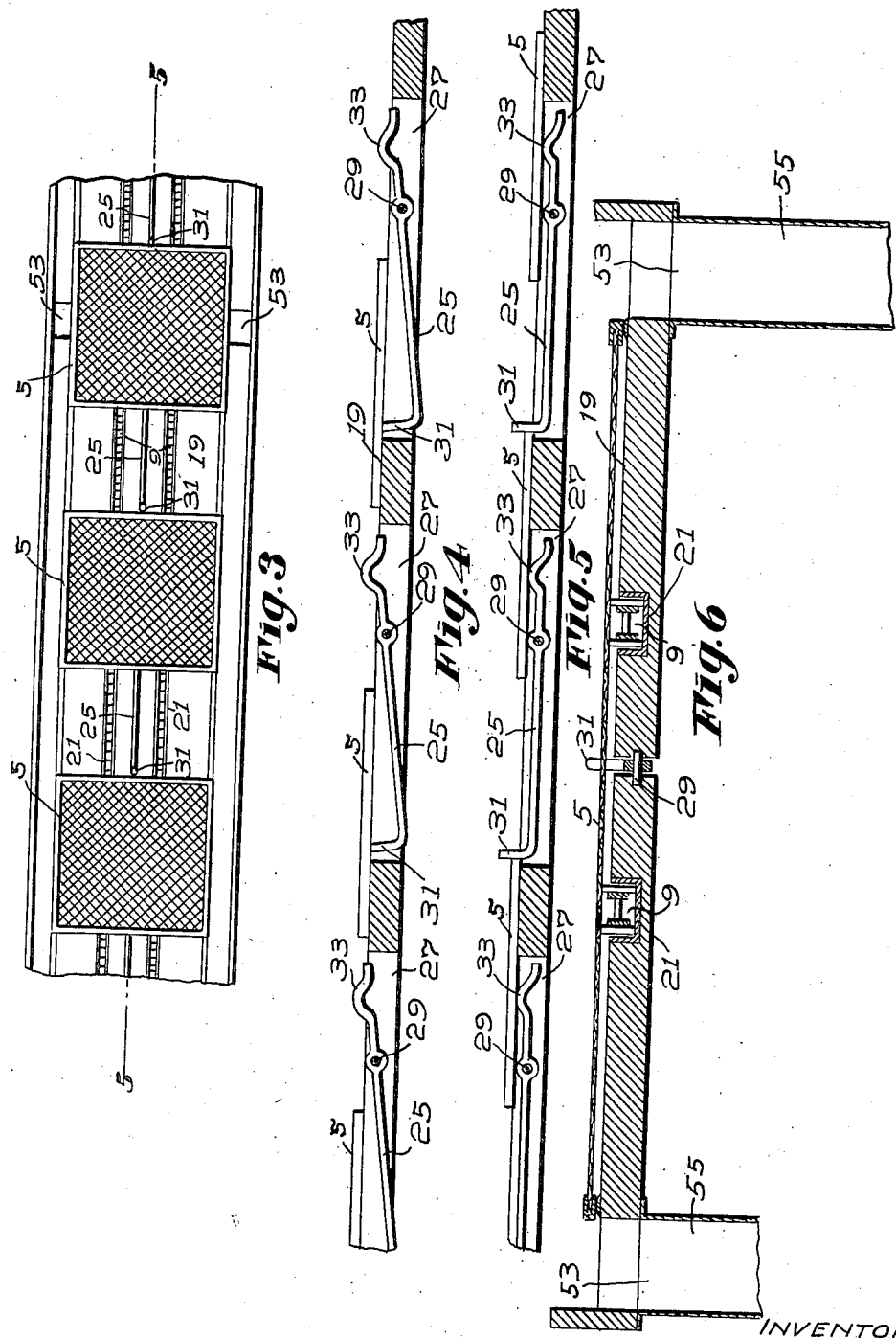

Patented Apr. 29, 1924.

1,492,178

UNITED STATES PATENT OFFICE.

HARRY E. NICHOLAS, OF LOS ANGELES, CALIFORNIA.

APPARATUS FOR USE IN CANNING AND OTHER INDUSTRIES.

Application filed May 31, 1922. Serial No. 564,949.

*To all whom it may concern:*

Be it known that I, HARRY E. NICHOLAS, a citizen of the United States, residing at Los Angeles, in the county of Los Angeles and State of California, have invented certain new and useful Improvements in Apparatus for Use in Canning and Other Industries, of which the following is a specification.

The invention to be hereinafter described relates to apparatus for use in packing sardines in cans, and other purposes.

One of the objects of the invention is to provide a compact, efficient apparatus comprising means for conveying trays or flakes filled with sardines to stations where the sardines are taken from the trays and packed in cans by the manual packers, means for carrying the empty trays away from the stations, means for delivering the empty cans to the stations, means for carrying the filled cans away from the stations, and means for removing refuse from the stations and from the path of travel of the filled trays.

Another object of the invention is to provide a continuously travelling conveyer having one run for conveying the filled trays to the stations, and another run for carrying the empty trays away from the stations, the run for the filled trays being provided with means automatically controlled by the trays for arresting the trays at the stations and holding the trays in spaced relation, so that the trays may be readily removed from the conveyer by the manual packers without interference with trays adjacent thereto. This means for automatically spacing the trays also prevents any possibility of one tray sliding onto another and mutilating the fish and pushing the same from the tray.

With the aforesaid and other objects in view, the character of the invention may be best understood by reference to the following description of an illustrative embodiment thereof shown in the accompanying drawings, wherein:

Fig. 2 is a vertical horizontal section through the apparatus;

Fig. 3 is a plan of a portion of the table and the conveyer for the loaded trays;

Figure 1:
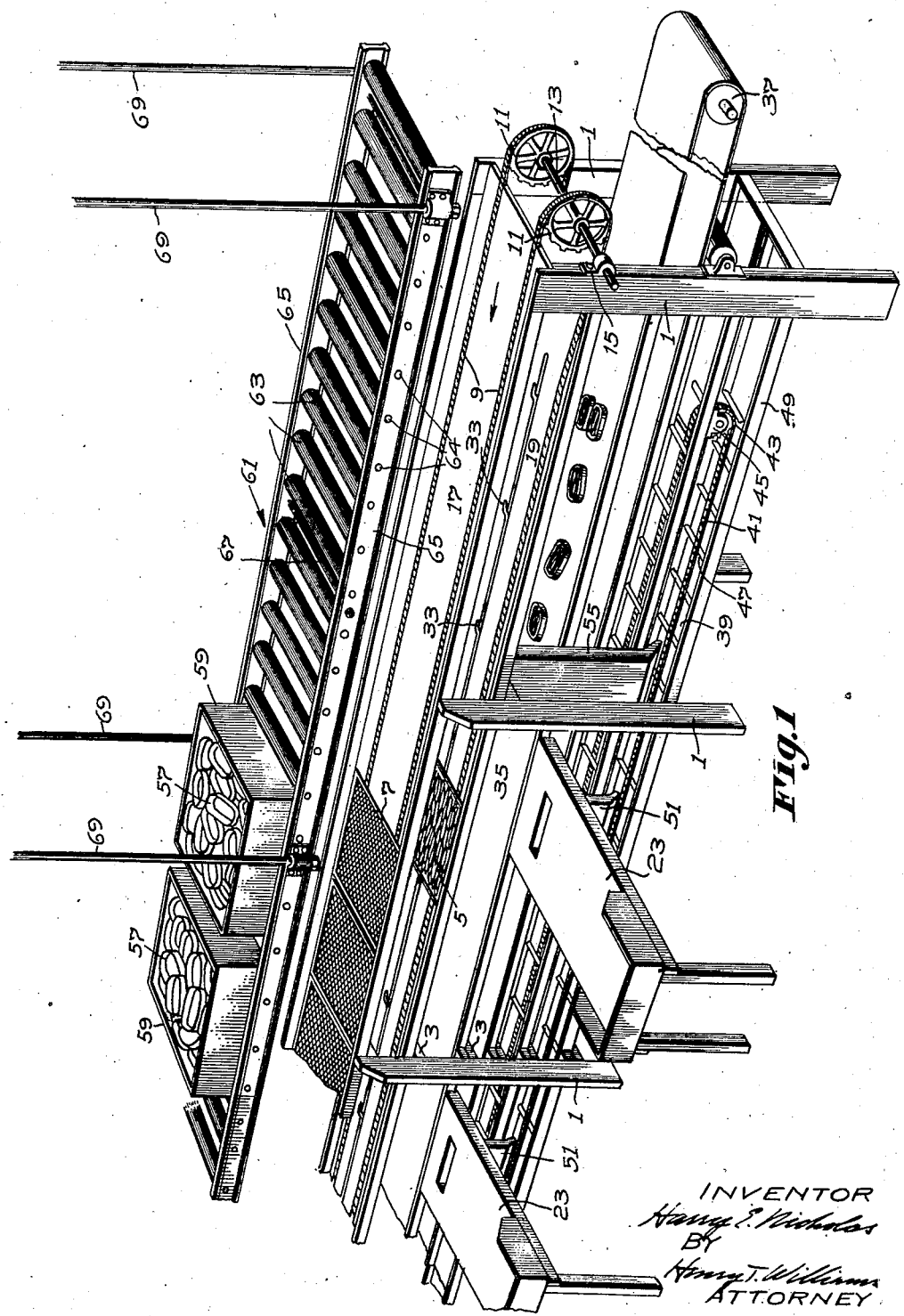
Fig. 1 is a perspective view of the apparatus.

Fig. 4 on an enlarged scale is a vertical longitudinal section through the construction shown in Fig. 3;

Fig. 5 is a view similar to Fig. 4, showing the stop devices in position for arresting travel of the filled trays; and Fig. 6 on an enlarged scale is a vertical transverse section through the loaded tray conveyer and the table associated therewith.

Referring to the drawings, the apparatus shown therein as an illustrative embodiment of the invention, may be provided with a support of any suitable construction, and in the present instance, comprises posts 1 arranged in pairs disposed at intervals along the length of the apparatus, the posts of each pair being connected by cross members 3.

The conveyer for the filled trays 5 and the empty trays 7, in the present instance of the invention, comprises a pair of sprocket chains 9 guided about sprocket wheels 11 mounted on a shaft 13 journalled in bearings 15 secured to the end posts 1. These sprocket chains may be of suitable length according to the number of packing stations, and the opposite ends of the sprocket chains are guided about sprocket wheels at the opposite end of the apparatus, as will be readily understood. Merely a portion of the apparatus is shown herein as sufficient to enable understanding of the invention.

The upper runs of the sprocket chains 9 pass over a table 17, and the lower runs of the sprocket chains pass over a table 19 and are received by channels 21 (Fig. 5) in the tables.

The filled trays are placed on the lower run of the conveyer at the left end of the apparatus, and are fed by the conveyer toward the right end of the apparatus past stations located at suitable intervals along one or both sides of the apparatus. At each station is a table, such, for example, as the table 23 at which the manual packers stand to perform the packing operations.

It is desirable automatically to arrest the travel of the filled trays at the several stations to enable the packers to transfer the filled trays from the conveyer to the tables. To accomplish this, stop devices may be provided similar to those disclosed in my application for Letters Patent of the United States, Serial No. 416,861, filed October 14, 1920. Each of these devices comprises a member 25 located in the path of travel of the conveyer, and in the present instance, in a recess 27 in the table 19, said member being pivotally mounted on a pin 29. The member 25 has a stop 31 and an actuator 33. The pin 29 is nearer the actuator than the stop, so that the member 25 tends to rock in a contra-clockwise direction to hold the stop beneath and the actuator above the surface of the table, as shown in Fig. 4.

When a filled tray has been fed by the conveyer into engagement with the actuator 33, the member 25 will be rocked in a clockwise direction, thereby elevating the stop 31 above the surface of the table and into the path of the next succeeding tray, as shown in Fig. 5. The conveyer will bring this following tray into engagement with the stop, and thereby arrest the tray and hold the same in spaced relation to the tray above the actuator.

The stop devices are located in suitable relation in respect to the stations, so that the trays will be automatically arrested at the stations, where they will be conveniently accessible to the packers. When a tray on the conveyer above an actuator is lifted therefrom, the member 25 will rock from its position shown in Fig. 5, back to its position shown in Fig. 4, and thereby allow the stop to drop from the path of the tray arrested thereby. Thereupon, the continuously travelling conveyer will feed this tray to the place above the stop device left vacant by removal of the preceding tray. As a consequence, the stop device will be again operated as previously described, and serve to arrest the next succeeding tray fed along by the conveyer.

After the fish have been removed from the tray on the packer's table 23, the tray is transferred from the table to the upper run of the conveyer, and conducted from the right to the left end of the apparatus, where the empty trays are removed from the conveyer.

Suitable means may be provided for conveying the filled cans from the packing stations to the machine for applying the covers to the cans and sealing the same. This means, in the present instance, comprises a belt conveyer 35 guided about rollers, such for example, as the roller 37. The manual packers transfer the filled cans from the tables 23 to the conveyer 35, and the cans are automatically fed thereby to the sealing machine.

Suitable means may be provided automatically to remove the broken or refuse fish from the packing tables 23, and from the table over which the filled trays are conveyed. To accomplish this, in the present instance, at each side of the apparatus a conveyer 39 is provided, conveniently in the form of a sprocket chain 41 guided about sprocket wheels, such, for example, as the sprocket wheel 43 journalled in bearings 45. Secured to the sprocket chain at intervals are cleats or members 47 adapted in the lower run of the sprocket chain to travel along and wipe through a trough 49 supported by the cross members of the frame of the apparatus.

Leading from each packing table to the trough 49 is a chute 51 for conducting the refuse from the table. Leading from apertures 53 located at intervals along the sides of the table 19, are chutes 55 having their lower delivery ends above the troughs 41. Any broken fish escaping from the filled trays onto the margins of the table 19, will be pushed along by the trays until they reach the apertures 53. Thereupon, they will fall into the chutes 55 and be delivered to the troughs 49. The conveyer cleats 47 will move along through the trough 49 and feed the refuse from the right to the left end of the apparatus, where the refuse is delivered therefrom.

Suitable means may be provided for conveying empty cans to the packing stations. The empty cans 57 may be placed in boxes 59, and these may be fed to the stations by a conveyer, in the present instance, in the form of a roller conveyer 61 of well known construction, comprising rollers 63 journalled on shafts 65 having their ends secured to a pair of side members 65 connected at intervals by bolts 67. The roller conveyer may be supported by hangers 69 depending from the ceiling of the room in which the apparatus is located. The roller conveyer is spaced a sufficient distance above the table 17 to enable the empty trays to be readily placed on the conveyer therefor.

The operation of the apparatus will be readily understood from the foregoing description. The several conveyers are disposed in superposed relation, and are sufficiently spaced to enable the manual packers readily to transfer the empty cans and the loaded trays from their conveyers to the packing tables, and transfer the empty trays and the filled cans from the packing tables to their conveyers. The refuse or broken fish will be automatically removed from the path of the loaded trays, and may be readily slid from the packing tables to the refuse conveyers.

The apparatus is simple and compact in construction, efficient in operation, and enables the fish to be packed expeditiously in the cans.

The conveyer having a run for the loaded trays and a run for the empty trays, enables the conveyer to be driven continuously to rapidly remove the empty trays from the apparatus, and the automatic stop devices located in the path of the loaded trays provide simple and efficient means under the control of the trays for automatically arresting the same adjacent the packing tables and for automatically holding the trays in spaced relation, thereby permitting the filled trays to be removed laterally from the conveyer to the packing tables without interference with adjacent trays. These stop devices do not in any way effect the operation of the conveyer, and permit the latter to be continuously driven without the necessity for an intermittently driven conveyer such as would be necessary in the absence of these simple tray controlled stop devices. Since the conveyer is continuously driven, it is always ready to advance the trays to the packing stations promptly on release of the stop devices as obtained by removal of advance trays from the conveyer. The consequence is that promptly on transfer of a loaded tray from the conveyer to the packing table, another tray is advanced to a point within easy reach of the packer standing at the table. Therefore, as soon as a tray on the packing table has been emptied, a filled tray is in readiness for transfer to the table, and there is no loss in time such as would occur if the packer after emptying a tray, were obliged to wait for a loaded tray.

While the apparatus has been described more particularly with reference to its use in packing sardines, it will be readily understood that it is not limited thereto, but is susceptible of other uses. Therefore, the terms appearing in the claims describing the articles conveyed by the apparatus, are to be regarded in a generic sense, and sufficiently comprehensive to cover other articles.

It will be understood that the invention is not limited to the specific embodiment shown, and that various deviations may be made therefrom without departing from the spirit and scope of the appended claims.

What is claimed is:—

1. In apparatus of the character described, the combination of a conveyer for feeding loaded trays to packing stations located at intervals along the conveyer, a refuse conveyer, and means located at intervals along the path of the loaded trays for delivering refuse from said path to the refuse conveyer.

2. In apparatus of the character described, the combination of a conveyer for feeding loaded trays to packing stations located at intervals along the conveyer, a table over which the loaded trays are adapted to be fed and having apertures at intervals in side margins thereof, a pair of refuse conveyers beneath said table, and chutes for delivering refuse from the table to said refuse conveyers.

HARRY E. NICHOLAS.